(12) United States Patent
Stenzel et al.

(10) Patent No.: US 7,855,248 B2
(45) Date of Patent: *Dec. 21, 2010

(54) HIGHLY DISPERSIBLE PRECIPITATED SILICA

(75) Inventors: Oleg Stenzel, Köln (DE); Stefan Uhrlandt, Belle Mead, NJ (US); Hans-Detlef Luginsland, Hoboken, NJ (US); André Wehmeier, Hürth (DE)

(73) Assignee: Evonik Degussa GmbH, Essen (DE)

(*) Notice: Subject to any disclaimer, the term of this patent is extended or adjusted under 35 U.S.C. 154(b) by 1321 days.

This patent is subject to a terminal disclaimer.

(21) Appl. No.: 10/523,029

(22) PCT Filed: Jul. 23, 2003

(86) PCT No.: PCT/EP03/08021

§ 371 (c)(1),
(2), (4) Date: Sep. 7, 2005

(87) PCT Pub. No.: WO2004/014795

PCT Pub. Date: Feb. 19, 2004

(65) Prior Publication Data

US 2006/0100344 A1 May 11, 2006

(30) Foreign Application Priority Data

Aug. 3, 2002 (DE) ................ 102 35 560
Jul. 4, 2003 (DE) ................ 103 30 221

(51) Int. Cl.
*B60C 1/00* (2006.01)

(52) U.S. Cl. ..................... 524/492; 423/339
(58) Field of Classification Search ............... 423/335; 524/493
See application file for complete search history.

(56) References Cited

U.S. PATENT DOCUMENTS

| 5,705,137 | A | * | 1/1998 | Goerl et al. | ............... | 423/335 |
| 5,859,117 | A | * | 1/1999 | Goerl et al. | ............... | 524/493 |
| 5,925,708 | A | | 7/1999 | Goerl et al. | | |
| 6,180,076 | B1 | * | 1/2001 | Uhrlandt et al. | ............. | 423/335 |
| 6,268,424 | B1 | | 7/2001 | Blume et al. | | |
| 6,613,309 | B2 | | 9/2003 | Uhrlandt et al. | | |
| 6,702,887 | B2 | | 3/2004 | Uhrlandt et al. | | |
| 2003/0003040 | A1 | * | 1/2003 | Lindner et al. | ............. | 423/335 |
| 2003/0059380 | A1 | | 3/2003 | Uhrlandt et al. | | |
| 2003/0082090 | A1 | | 5/2003 | Blume et al. | | |

OTHER PUBLICATIONS

Evans, L. R. et al: "Ultra-High Reinforcing Precipitated Silica for Tire and Rubber Applications Extrem Hochverstarkendes Gefalltes Siliciumdioxid Fur Die Anwendung in Reifen Und Gummiartikeln" Kautschuk Und Gummi- Kunststoffe, Dr. Alfred Huthig Verlag GMBH., vol. 48, No. 10, pp. 718-723, Oct. 1, 1995.

(Continued)

*Primary Examiner*—Timothy C Vanoy
*Assistant Examiner*—Richard M Rump
(74) *Attorney, Agent, or Firm*—Oblon, Spivak, McClelland, Maier & Neustadt, L.L.P.

(57) ABSTRACT

The present invention relates to a highly disperse precipitated silica which has a high surface area, to a process for preparing it, and to its use as a tire filler for commercial vehicles, motorbikes, and high-speed vehicles.

28 Claims, 1 Drawing Sheet

Figure 1:
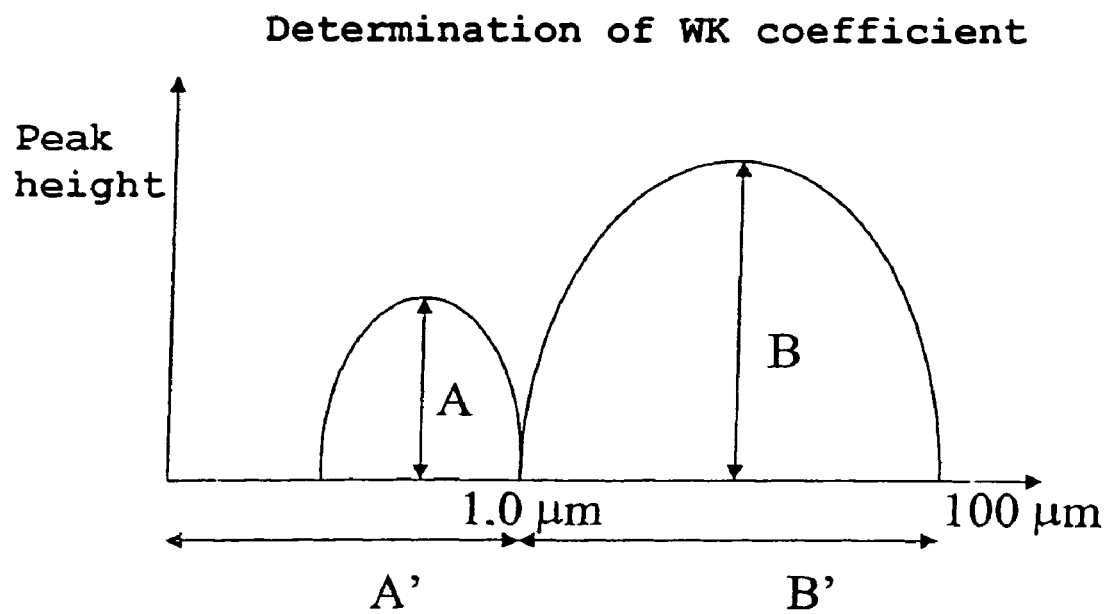

Determination of WK coefficient $$WK = \frac{\text{Peak height (B) of the particles which cannot be broken down}}{\text{Peak height (A) of the broken - down particles}}$$

A' = Range from 0 to <1.0 μm
B' = Range 1.0 μm - 100 μm

OTHER PUBLICATIONS

U.S. Appl. No. 10/522,672, filed Jan. 28, 2005, Uhrlandt, et al.
U.S. Appl. No. 10/523,414, filed Feb. 3, 2005, Uhrlandt, et al.
U.S. Appl. No. 11/058,293, filed Feb. 16, 2005, Blume, et al.
U.S. Appl. No. 10/516,308, filed Dec. 10, 2004, Uhrlandt, et al.
U.S. Appl. No. 10/542,850, Jul. 21, 2005, Luginsland, et al.
U.S. Appl. No. 10/542,763, Jul. 20, 2005, Stenzel, et al.
U.S. Appl. No. 10/522,672 filed Jan. 28, 2005, Uhrlandt, et al.
U.S. Appl. No. 10/523,414 filed Feb. 03, 2005, Uhrlandt, et al.
U.S. Appl. No. 10/523,029 filed 10/523,029 Feb. 02, 2005, Stenzel, et al.
U.S. Appl. No. 11/058,293 filed Feb. 16, 2005, Blume, et al.
U.S. Appl. No. 10/516,308 filed Dec. 10, 2004, Uhrlandt, et al.
U.S. Appl. No. 60/099,934 filed Sep. 11, 1998.

* cited by examiner $$WK = \frac{\text{Peak height (B) of the particles which cannot be broken down}}{\text{Peak height (A) of the broken - down particles}}$$

A' = Range from 0 to <1.0 µm
B' = Range 1.0 µm - 100 µm

HIGHLY DISPERSIBLE PRECIPITATED SILICA

The present invention relates to a highly dispersible precipitated silica which has a high surface area, to a process for preparing it, and to its use as a tire filler for commercial vehicles, motorbikes and high-speed vehicles.

The use of precipitated silicas in elastomer blends such as tires has been known for a long time. Silicas used in tires are subject to stringent requirements. They should be amenable to easy and thorough dispersion in the rubber, should bond well with the polymer chains present in the rubber and with the other fillers, and should have a high abrasion resistance akin to that of carbon black. Besides the dispersibility of the silica, therefore, the specific surface areas (BET or CTAB) and the oil absorption capacity (DBP) are important. The surface properties of silicas are critical determinants of their possible application: certain applications of a silica (for example, carrier systems or fillers for elastomer blends) demand particular surface properties.

Thus U.S. Pat. No. 6,013,234 discloses the preparation of precipitated silica having a BET and CTAB surface area of in each case from 100 to 350 m²/g. This silica is particularly suitable for incorporation into elastomer blends, with the BET/CTAB ratios being between 1 and 1.5. EP 0 937 755 discloses various precipitated silicas which possess a BET surface area of from about 180 to about 430 m²/g and a CTAB surface area of from about 160 to 340 m²/g. These silicas are particularly suitable as carrier material and have a BET to CTAB ratio of from 1.1 to 1.3. EP 0647591 discloses a precipitated silica which has a ratio of BET to CTAB surface area of from 0.8 to 1.1, it being possible for these surface characteristics to adopt absolute values of up to 350 m²/g. EP 0643015 presents a precipitated silica which can be used as an abrasive and/or thickening component in toothpastes and which has a BET surface area of from 10 to 130 m²/g and a CTAB surface area of from 10 to 70 m²/g, i.e. a BET to CTAB ratio of from about 1 to 5.21.

Silicas which are especially suitable as fillers for elastomer blends, and in particular automobile tires, are described in EP 0901986 with the following properties:

| | |
|---|---|
| BET surface area | 120-300 m²/g |
| CTAB surface area | 100-300 m²/g |
| BET/CTAB ratio | 0.8-1.3 |
| Sears number (consumption of 0.1 N NaOH) | 6-25 ml |
| DBP number | 150-300 g/100 g |
| WK coefficient | <3.4 |
| Particle size of the broken-down particles | <1.0 μm |
| Particle size of the particles not broken down | 1.0-100 μm |

Vehicle tires are subject to very different requirements depending on their end use. Given a rough division into automobile and truck tires, the following differences at least must be taken into account:

| | Requirement for automobile tires (recommended values) | Requirement for truck tires (recommended values) |
|---|---|---|
| Principal tread component | E- and S-SBR/BR blends | NR, in part as BR blend |
| Retreadability | unimportant | at least 3 times |
| Distance performance | 40 000 km in Europe 64 000 km in the USA | 3 × 200 000 km |
| Maximum speed | 160-240 km/h and higher | 100 km/h (max. 140 km/h) |
| Filling pressure | 2.2 bar | 8.5 bar |
| Load-carrying capacity per axle | 1000 kg | 6300 kg (with single tire fitted) |
| Off-road use | low | high |
| Heat buildup | low | very important |
| Rolling resistance | very important | important |
| Tensile strength | low | important |

Automobiles for the purposes of the present invention are vehicles for personal transport for predominantly private use, i.e., not commercial vehicles such as delivery vehicles, for example. This does not include vehicles which are commonly operated at high speeds, even if they might be classed as automobiles on the basis of their construction. These vehicles have different tire requirements again than the automobile tires specified in the table.

Tires for motorbikes and high-speed automobiles must likewise exhibit high loads at high speeds and a very good dry and wet traction. Good traction, however, should not be associated with increased wear and/or high rolling resistance.

The differing tire requirements of vehicles have corresponding consequences for the fillers that are used in the tires. The admixing of silicas and organosilicon compounds as a filler system, which is long established in automobile tires, results in reduced rolling resistance, enhanced traction, and reduced wear. Transferring these enhanced properties to tires for commercial vehicles such as trucks would be desirable, since a reduced rolling resistance is associated with a lower fuel consumption. The different tire requirements of said vehicles, however, lead automatically to different requirements in terms of the fillers used.

It has been found that the silicas used in automobile tires are unsuitable for use in truck tires, motorbike tires, and high-speed automobile tires owing to the different profile of requirements. It is an object of the present invention, therefore, to provide precipitated silicas having a profile of properties which is specifically attuned to these vehicles. The skilled worker is aware that, when active carbon blacks are used as a tire filler, with an increase in the surface area, an improvement in the strengthening and thus in the wear resistance of the tire is obtained. The use of carbon blacks with high surface areas (CTAB surface area >130 m²/g), however, is limited in mixtures with such filling, owing to the sharply increasing heat buildup (hysteresis behavior, described and measurable according to DIN 53535 or according to the references cited in this DIN).

It has now been found that a precipitated silica which has a high CTAB surface area is particularly suitable as a filler in elastomer blends for commercial vehicle tire systems, for motorbike tires, and for tires for high-speed automobiles.

The present invention accordingly provides precipitated silicas having a BET surface area of 178-302 m²/g, a CTAB surface area of ≧170 m²/g, a DBP number of 200-300 g/(100 g), preferably 207-276 g/(100 g), and a Sears number $V_2$ of 10-35, preferably 10-25, 10-20, 10-16 ml/(5 g).

Owing to the greatly reduced hysteresis when silica of the invention is used as filler, therefore, it is also possible to realize surfaces which are prohibited in the case of carbon black, owing to the higher hysteresis, and so lead to an improvement in the wear resistance.

EP 1186629 discloses silicas with high CTAB surface areas which are suitable as fillers for tires. Indications of the Sears number and hence of the concentration of hydroxyl groups on the surface of the silica are not evident from EP 1186629.

The precipitated silicas of the invention can have a maximum CTAB surface area of 300 m$^2$/g, in particular a CTAB surface area of 170-220 m$^2$/g or 245-300 m$^2$/g.

The precipitated silicas of the invention can have a BET surface area in the preferred ranges of 178-257 m$^2$/g or 257-300 m$^2$/g or 190-230 m$^2$/g.

The present invention additionally provides a process for preparing a precipitated silica having a

| | |
|---|---|
| BET surface area | 178-302 m$^2$/g |
| CTAB surface area | $\geq$170 m$^2$/g |
| DBP number | 200-300 g/(100 g) |
| Sears number $V_2$ | 10-35 ml/(5 g) | in which
a) an aqueous solution of an alkali metal silicate or alkaline earth metal silicate and/or of an organic and/or inorganic base with pH 7.0-8.5 is introduced as initial charge,
b) waterglass and an acidifier are metered simultaneously into this initial charge with stirring at 55-95°C. for 10-120, preferably 10-60, minutes,
e) the mixture is acidified with an acidifier to a pH of approximately 3.5, and
f) the acidified mixture is filtered and dried.

In addition to the preferential ranges already stated for the BET and CTAB surface areas, the precipitated silicas prepared in accordance with the invention may in each case independently have properties within the following preferential ranges:

| | |
|---|---|
| DBP absorption | 200-300 g/(100 g), especially 207-276 g/(100 g) |
| WK coefficient | $\leq$3.4, preferably $\leq$3.0, especially $\leq$2.5 |
| Sears number $V_2$ | 10-25, especially 10-20, preferably 10-16 ml/(5 g). |

The WK coefficient is defined as the ratio of the peak height of the particles in the size range 1.0-100 μm which cannot be broken down by ultrasound to the peak height of the broken-down particles in the size range <1.0 μm (see FIG. 1).

The initial charge may amount to around 20, 30, 40, 50, 60, 70, 80 or 90% of the final volume of the precipitation. The basic compounds that are added to the initial charge are selected in particular from the group consisting of alkali metal hydroxides, alkaline earth metal hydroxides, alkali metal carbonates, alkali metal hydrogen carbonates, and alkali metal silicates. Preference is given to using waterglass and/or sodium hydroxide solution. The pH of the initial charge lies between 7.0 and 8.5, preferably between 7.5 and 8.5.

The process of the invention may optionally comprise a holding point. In that case, the following steps are carried out between steps b) and e):

c) stopping of the metered addition for 30-90 minutes, during which the temperature is maintained, and
d) simultaneous metered addition of waterglass and an acidifier, preferably sulfuric acid, at the same temperature with stirring for 20-120, preferably 20-80, minutes.

An additional addition of organic or inorganic salts during steps b) and d) is optional. This can be carried out in solution or as a solid, in each case continuously over the time of addition of the waterglass and the acidifier, preferably sulfuric acid, or in the form of a batch addition. It is also possible to dissolve the salts in one or both components and then to add them simultaneously with these components.

As inorganic salts it is preferred to use alkali metal or alkaline earth metal salts. In particular it is possible to use combinations of the following ions: Li$^+$, Na$^+$, K$^+$, Rb$^+$, Be$^{2+}$, Mg$^{2+}$, Ca$^{2+}$, Sr$^{2+}$, Ba$^{2+}$, H$^+$, F$^-$, Cl$^-$, Br$^-$, I$^-$, SO$_3^{2-}$, SO$_4^{2-}$, HSO$_4^-$, PO$_3^{3-}$, PO$_4^{3-}$, NO$_3^-$, NO$_2^-$, CO$_3^{2-}$, HCO$_3^-$, OH$^-$, TiO$_3^{2-}$, ZrO$_3^{2-}$, ZrO$_4^{4-}$, AlO$_2^-$, Al$_2$O$_4^{2-}$, BO$_4^{3-}$.

Suitable organic salts are the salts of formic, acetic, and propionic acid. Cations that may be mentioned include the specified alkali metal ions or alkaline earth metal ions. The concentration of these salts in the solution for addition can be from 0.01 to 5 mol/l. As an inorganic salt it is preferred to use Na$_2$SO$_4$.

It is possible to supply the acidifier in steps b) and d) in the same way or in different ways, i.e., with the same or different concentration and/or rates of addition.

Similarly, waterglass as well can be supplied to the reaction in the same way or in different ways in steps b) and d).

In one particular embodiment, in steps b) and d) the acidifier and waterglass components are supplied such that the rates of addition in step d) is 125-140% of the rates of addition in step b), the components being used in each case in in each case equimolar concentration in both steps. It is preferred to add the components at the same concentration and rate of addition.

Besides waterglass (sodium silicate solution) it is also possible to use other silicates such as potassium silicate or calcium silicate. In addition to sulfuric acid it is also possible to use other acidifiers such as HCl, HNO$_3$, H$_3$PO$_4$ or CO$_2$.

The filtration and drying of the silicas of the invention are familiar to the skilled worker and can be read, for example, in the documents cited. The as-precipitated silica is preferably dried in a pneumatic conveying drier, spray drier, rack drier, belt drier, rotary tube drier, flash drier, spin-flash drier or nozzle tower. These drying variants include operation with an atomizer, a single-fluid or two-fluid nozzle or an integrated fluid bed. After the drying step the precipitated silica of the invention preferably has a particle morphology with an average diameter of more than 15 μm, in particular more than 80 μm, with particular preference more than 200 μm. The average particle diameter is defined such that 50% by weight of the particles have a larger or smaller diameter.

After drying it is also possible to carry out granulation using a roll compactor. In this case the average particle diameter is $\geq$1 mm.

The silica of the invention is preferably used in tires for commercial vehicles, trucks, high-speed automobiles, and motorbikes.

Commercial vehicles for the purposes of the present invention are considered to be all vehicles whose tires are subject to stringent demands in respect of distance performance and/or wear. With regard to the requirement of a high distance performance, mention is made in particular of tires for buses, trucks and/or delivery vehicles and also trailers. In respect of wear resistance such as bar tear resistance, chipping, chunking, for example, tires for off-road vehicles, construction and agricultural machines, mine vehicles, and tractors are to be mentioned. Reference here is in particular to vehicles having an axle load of more than 1 tonne or with a permissible overall weight of more than 2, 4, 7.5 or 15 tonnes. The silicas of the invention can be used in particular in traction tires for heavy trucks or their trailers. Vehicles of this kind frequently have axle loads of more than 5 tonnes and/or a tire diameter of more than 17".

Tires for commercial vehicles such as trucks are classified according to speed. The silicas of the invention are particularly suitable for (truck) tires which are approved for speeds of between 80 and 140 km/h and carry the symbols F, G, J, K, L, M or N.

Tires for high-speed vehicles (motorbikes or automobiles) are those approved for a speed of more than 180 km/h. These are (automobile) tires bearing the symbols S, T, U, H, V, W, Y and ZR.

The invention further provides elastomer blends, vulcanizable rubber blends and/or other vulcanizates comprising the silica of the invention, such as, for example, shaped structures such as pneumatic tires, tire treads, cable covers, hoses, drive belts, conveyor belts, roll covers, tires, footwear soles, gaskets, and damping elements.

Moreover, the silicas of the invention can be used in all applications in which silicas are commonly used, such as, for example, in battery separators, as antiblocking agents, as flatting agents in inks and paints, as carriers of agricultural products and foods, in coatings, in printing inks, in firefighting powders, in plastics, in the nonimpact printing sector, in paperstock, in the personal care sector, and in specialty applications.

By use in the nonimpact printing sector, such as in the inkjet process, for example, is meant the use of the silicas of the invention in
  printing inks, for thickening or for preventing splashing and offset,
  paper, as filler or coating pigment, lubricant paper, heat-sensitive paper, in thermal sublimation, for preventing strikethrough of printing inks, for improving imaging background uniformity and contrast, and for improving dot definition and color brilliance.

By use in the personal care sector is meant the use of the silicas of the invention as filler or thickener, e.g., in the pharmaceutical or body care sector.

The silica of the invention may optionally be modified with silanes or organosilanes of the formulae I to III

$$[SiR^1{}_n(RO)_r(Alk)_m(Ar)_p]_q[B] \quad (I),$$

$$SiR^1{}_n(RO)_{3-n}(Alkyl) \quad (II),$$

or

$$SiR^1{}_n(RO)_{3-n}(Alkenyl) \quad (III),$$

where

B is —SCN, —SH, —Cl, —NH$_2$, —OC(O)CHCH$_2$, —OC(O)C(CH$_3$)CH$_2$ (if q=1) or —S$_w$— (if q=2), B being bound chemically to Alk, R and R$^1$ are aliphatic, olefinic, aromatic or arylaromatic radicals having 2-30 carbon atoms which may optionally be substituted by the following groups: hydroxyl, amino, alkoxide, cyanide, thiocyanide, halogen, sulfonic acid, sulfonic ester, thiol, benzoic acid, benzoic ester, carboxylic acid, carboxylic ester, acrylate, methacrylate, organosilane radicals, it being possible for R and R$^1$ to have an identical or different definition or substitution, n is 0, 1 or 2, Alk is a divalent unbranched or branched hydrocarbon radical having from 1 to 6 carbon atoms, m is 0 or 1, Ar is an aryl radical having from 6 to 12 carbon atoms, preferably 6 carbon atoms, which may be substituted by the following groups: hydroxyl, amino, alkoxide, cyanide, thiocyanide, halogen, sulfonic acid, sulfonic ester, thiol, benzoic acid, benzoic ester, carboxylic acid, carboxylic ester, organosilane radicals, p is 0 or 1 with the proviso that p and n are not simultaneously 0, q is 1 or 2, w is a number from 2 to 8, r is 1, 2 or 3, with the proviso that r+n+m+p=4, Alkyl is a monovalent unbranched or branched saturated hydrocarbon radical having from 1 to 20 carbon atoms, preferably from 2 to 8 carbon atoms, and Alkenyl is a monovalent unbranched or branched unsaturated hydrocarbon radical having from 2 to 20 carbon atoms, preferably from 2 to 8 carbon atoms.

The silica of the invention may also be modified with organosilicon compounds of the composition $SiR^2{}_{4-n}X_n$ (with n=1, 2, 3), $[SiR^2{}_xX_yO]_z$ (with $0 \leq x \leq 2$; $0 \leq y \leq 2$; $3 \leq z \leq 10$, with x+y=2), $[SiR^2{}_xX_yN]_z$ (with $0 \leq x \leq 2$; $0 \leq y \leq 2$; $3 \leq z \leq 10$; with x+y=2), $SiR^2{}_nX_mOSiR^2{}_oX_p$ (with $0 \leq n \leq 3$; $0 \leq m \leq 3$; $0 \leq o \leq 3$; $0 \leq p \leq 3$, with n+m=3, o+p=3), $SiR^2{}_nX_mNSiR^2{}_oX_p$ (with $0 \leq n \leq 3$; $0 \leq m \leq 3$; $0 \leq o \leq 3$; $0 \leq p \leq 3$; with n+m=3, o+p=3), $SiR^2{}_nX_m[SiR^2{}_xX_yO]_z SiR^2{}_oX_p$ (with $0 \leq n \leq 3$; $0 \leq m \leq 3$; $0 \leq x \leq 2$; $0 \leq y \leq 2$; $0 \leq o \leq 3$; $0 \leq p \leq 3$; $1 \leq z \leq 10000$, with n+m=3, x+y=2, o+p=3). These compounds may be linear, cyclic, and branched, silane, silazane, and siloxane compounds. R$^2$ may comprise alkyl and/or aryl radicals having 1-20 carbon atoms which may be substituted by functional groups such as the hydroxyl group, the amino group, polyethers such as ethylene oxide and/or propylene oxide, and halide groups such as fluoride. R$^2$ may also contain groups such as alkoxy, alkenyl, alkynyl, and aryl groups, and groups containing sulfur. X may also comprise reactive groups such as silanol, amino, thiol, halide, alkoxy, alkenyl, and hydride groups.

Preference is given to using linear polysiloxanes of the composition $SiR^2{}_nX_m[SiR^2{}_xX_yO]_z SiR^2{}_oX_p$ (with $0 \leq n \leq 3$; $0 \leq m \leq 3$; $0 \leq x \leq 2$; $0 \leq y \leq 2$; $0 \leq o \leq 3$; $0 \leq p \leq 3$; $1 \leq z \leq 10000$, with n+m=3; x+y=2; o+p=3) in which R$^2$ is preferably represented by methyl.

Particular preference is given to using polysiloxanes of the composition $SiR^2{}_nX_m[SiR^2{}_xX_yO]_z SiR^2{}_oX_p$ (with $0 \leq n \leq 3$; $0 \leq m \leq 1$; $0 \leq x \leq 2$; $0 \leq y \leq 2$; $0 \leq o \leq 3$; $0 \leq p \leq 1$; $1 \leq z \leq 10000$, with n+m=3; x+y=2; o+p=3) in which R$^2$ is preferably represented by methyl.

The optionally granulated, ungranulated, ground and/or unground precipitated silica may be modified with one or more of the specified organosilanes in mixtures of from 0.5 to 50 parts per 100 parts of precipitated silica, in particular from 1 to 15 parts per 100 parts of precipitated silica, it being possible for the reaction between precipitated silica and organosilane to be conducted during the preparation of the mixture (in situ) or outside, by sprayed application and subsequent thermal conditioning of the mixture, by mixing the organosilane and the silica suspension, with subsequent drying and thermal conditioning (in accordance with DE 3437473 and DE 19609619, for example) or in accordance with the process described in DE 19609619 or DE-C 4004781.

Suitable organosilicon compounds include in principle all bifunctional silanes which are able to produce, on the one hand, coupling to the silanol-functional filler and, on the other hand, coupling to the polymer. Common amounts of organosilicon compounds that are used are from 1 to 10% by weight based on the total amount of precipitated silica.

Examples of these organosilicon compounds are: bis(3-triethoxysilylpropyl)tetrasulfane, bis(3-triethoxysilylpropyl)disulfane, vinyltrimethoxysilane, vinyltriethoxysilane, 3-mercaptopropyltrimethoxysilane, 3-mercaptopropyltriethoxysilane, 3-aminopropyltrimethoxysilane, and 3-aminopropyltriethoxysilane. Further organosilicon compounds are described in WO 99/09036, EP 1108231, DE 10137809, DE 10163945, and DE 10223658.

In one preferred embodiment of the invention the silane used can be bis(triethoxysilylpropyl)tetrasulfane.

The silica of the invention may be incorporated into elastomer blends, tires or vulcanizable rubber mixtures as a reinforcing filler in amounts of from 5 to 200 parts per 100 parts of rubber, in the form of powders, bead product or granules, both with silane modification and without silane modification.

Rubber mixtures and elastomer mixtures are to be regarded as equivalent within the meaning of the present invention.

Besides mixtures containing exclusively the silicas of the invention, with and without the organosilanes mentioned as fillers, the elastomer or rubber mixtures may additionally be filled with one or more fillers having a greater or lesser reinforcing effect.

As further fillers it is possible to use the following materials:

Carbon blacks: the carbon blacks for use here are produced by the lamp black, furnace black or gas black process and possess BET surface areas of from 20 to 200 $m^2/g$, such as, for example, SAF, ISAF, HSAF, HAF, FEF or GPF blacks. The blacks may also where appropriate contain heteroatoms such as silicon, for example.

Highly disperse pyrogenic silicas, produced, for example, by flame hydrolysis of silicon halides. The silicas may also be present where appropriate in the form of mixed oxides with other metal oxides, such as the oxides of Al, Mg, Ca, Ba, Zn, and titanium.

Other commercial silicas.

Synthetic silicates, such as aluminum silicate, alkaline earth metal silicates such as magnesium silicate or calcium silicate, having BET surface areas of from 20 to 400 $m^2/g$ and primary particle diameters of from 10 to 400 nm.

Synthetic or natural aluminas and aluminum hydroxides.

Natural silicates, such as kaolin and other naturally occurring silicon dioxide compounds.

Glass fibers and glass-fiber products (mats, strands) or glass microbeads.

Starch and modified starch grades.

Natural fillers, such as clays and siliceous chalk, for example.

As is the case for the metered addition of the organosilanes, the blending ratio is guided by the profile of properties which it is desired to obtain in the finished rubber blend. A ratio of 5-95% between the silicas of the invention and the other fillers mentioned above (as a mixture as well) is conceivable and is also realized in this context.

In one particularly preferred embodiment it is possible to use from 10 to 150 parts by weight of silicas, composed in whole or in part of the silica of the invention, together where appropriate with from 0 to 100 parts by weight of carbon black and from 1 to 10 parts by weight of an organosilicon compound, based in each case on 100 parts by weight of rubber, to produce the blends.

Besides the silicas of the invention, the organosilanes, and other fillers, the elastomers form a further important constituent of the rubber blend. Mention may be made in this context of elastomers, natural and synthetic, oil-extended or otherwise, as individual polymers or as blends with other rubbers, such as natural rubbers, polybutadiene (BR), polyisoprene (IR), styrene/butadiene copolymers with styrene contents of 1 to 60%, preferably 2 to 50% by weight (SBR), prepared especially by means of the solution polymerization process, butyl rubbers, isobutylene/isoprene copolymers (IIR), butadiene/-acrylonitrile copolymers with acrylonitrile contents of 5 to 60%, preferably 10 to 50% by weight (NBR), partially or fully hydrogenated NBR rubber (HNBR), ethylene/propylene/diene copolymers (EPDM), and blends of these rubbers.

For mixtures with the aforementioned rubbers, the following additional rubbers are also suitable: carboxyl rubbers, epoxy rubbers, trans-polypentenamers, halogenated butyl rubbers, 2-chlorobutadiene rubbers, ethylene-vinyl acetate copolymers, ethylene-propylene copolymers, and, where appropriate, chemical derivatives of natural rubber, and also modified natural rubbers.

Preferred synthetic rubbers are described for example in W. Hofmann, "Kautschuktechnologie", Genter Verlag, Stuttgart 1980.

For producing the tires of the invention particular interest attaches to anionically polymerized S-SBR rubbers (solution-SBR) having a glass transition temperature of above −50° C., and also mixtures thereof with diene rubbers.

The silicas of the invention, with and without silane, can find application in all uses of rubber, such as shaped articles, tires, tire treads, conveyor belts, seals, drive belts, hoses, footwear soles, cable sheaths, roll coverings, damping elements, etc.

The incorporation of this silica and the preparation of the mixtures comprising this silica take place in the manner customary in the rubber industry, on an internal mixer or roll unit, preferably at 80-200° C. The presentation or use form of the silicas may be that of a powder, of bead product or of granules. In this respect too, the silicas of the invention do not differ from the known pale-colored fillers.

The rubber vulcanizates of the invention may comprise further rubber auxiliaries in the customary amounts, such as reaction accelerators, aging inhibitors, heat stabilizers, light stabilizers, ozone protectants, processing auxiliaries, plasticizers, tackifiers, blowing agents, dyes, pigments, waxes, extenders, organic acids, retardants, metal oxides and activators, such as triethanolamine, polyethylene glycol, and hexanetriol. These compounds are known in the rubber industry.

The rubber auxiliaries may be used in known amounts, which depend among other things on the intended use. Customary amounts are, for example, amounts from 0.1 to 50% by weight, based on rubber. As crosslinkers it is possible to use sulfur or sulfur donor substances. The rubber blends of the invention may further comprise vulcanization accelerators. Examples of suitable principal accelerators are mercaptobenzothiazoles, sulfenamides, thiurams, dithiocarbamates in amounts from 0.5 to 3% by weight. Examples of coaccelerators are guanidines, thioureas, and thiocarbonates in amounts from 0.5 to 5% by weight. Sulfur can be used customarily in amounts from 0.1 to 10% by weight, preferably 1 to 3% by weight, based on rubber.

The silicas of the invention can be used in rubbers which are crosslinkable with accelerators and/or sulfur, but can also be crosslinked peroxidically.

The vulcanization of the rubber blends of the invention can take place at temperatures from 100 to 200° C., preferably from 130 to 180° C., under pressures from 10 to 200 bar where appropriate. The blending of the rubbers with the filler, rubber auxiliaries where appropriate, and the organosilicon compound may be carried out in known mixing equipment, such as rolls, internal mixers, and mixing extruders.

The highly dispersible high surface area silicas of the invention have the advantage that they give the rubber vulcanizates improved abrasion resistance owing to the relatively high CTAB surface area. Moreover, dry handling is enhanced by the greater dynamic stiffness at 0° C. and 60° C., and a reduction is achieved in the rolling resistance, as indicated by the reduced tan δ (60° C.) value. In analogy to carbon blacks, the use of these highly dispersible, high surface area silicas of the invention is accompanied by attainment of improved cut & chip and chunking behavior (for definition and further details see "New insights into the tear mechanism" and references therein, presented at Tire Tech 2003 in Hamburg by Dr. W. Niedermeier).

The rubber blend of the invention is particularly suitable for producing tire treads having an improved, lower rolling resistance, improved wet slip resistance, improved dry properties, and good abrasion resistance, as compared with an identical rubber blend incorporating existing silicas. These tread blends are especially suitable for high-speed automobile and motorbike tires, but also for tires for commercial vehicles, combining reduced rolling resistance with good abrasion resistance and improved cut & chip and chunking behavior.

Additionally, without the addition of organosilicon compounds, the silicas of the invention are suitable in the form of a blend with a typical tread-grade carbon black for enhancing the cut & chip characteristics of tires for construction, agriculture machinery, and mine vehicles.

In order to achieve a good set of values in a polymer mixture, the dispersion of the precipitated silica in the matrix, the polymer, is of critical importance. It can be estimated through the WK coefficient.

FIG. 1 is a diagram of the values needed to calculate the WK coefficient.

The plots show a first maximum in particle size distribution around 1.0-100 μm and a further maximum in the region <1.0 μm. The peak in the 1.0-100 μm region indicates the fraction of uncomminuted silica particles following ultrasound treatment. These particles, which are fairly coarse, are poorly dispersed in the rubber blends. The second peak, with much smaller particle sizes (<1.0 μm), indicates the fraction of silica particles which has been comminuted during ultrasound treatment. These very small particles are dispersed to outstanding effect in rubber blends. The WK coefficient, then, is the ratio of the peak height (B) of the particles which cannot be broken down, whose maximum lies in the 1.0-100 μm range (B'), to the peak height (A) of the broken-down particles, whose maximum lies in the region <1.0 μm (A').

The WK coefficient is thus a measure of the "breakdownability" (i.e. dispersibility) of the precipitated silica. The rule is that, the lower the WK coefficient, the easier it is to disperse a precipitated silica; in other words, the greater the number of particles which are broken down during incorporation into rubber.

The silicas of the invention have WK coefficients $\leq 3.4$, preferably $\leq 3.0$, with particular preference $\leq 2.5$. Known precipitated silicas have other WK coefficients and other maxima in the particle size distributions as measured using the Coulter LS 230, and are therefore less readily dispersible.

The physicochemical data of the precipitated silicas of the invention are determined by means of the following methods:

Determination of the Moisture Content of Silicas

In accordance with this method, based on ISO 787-2, the volatile fractions (referred to below as moisture content for the sake of simplicity) of silica are determined after drying at 105° C. for 2 hours. This drying loss is generally composed predominantly of water moisture.

Procedure 10 g of the silica in powder, bead or granule form is weighed out to an accuracy of 0.1 mg (initial mass E) into a dry glass weighing boat with ground glass lid (diameter 8 cm, height 3 cm). With the lid open, the sample is dried in a drying cabinet at 105±2° C. for 2 h. The weighing boat is then sealed and cooled to room temperature in a desiccator cabinet with silica gel desiccant. The final mass A is determined gravimetrically.

The moisture content in % is determined from ((E in g-A in g)*100%)/(E in g).

Determination of the Modified Sears Number of Silicas

The modified Sears number (referred as Sears number $V_2$ below) can be determined, as a measure of the number of free hydroxyl groups, by titrating silica with potassium hydroxide solution in the pH range from 6 to 9.

The determination method is based on the following chemical reactions, where "Si"—OH is intended to symbolize a silanol group of the silica: "Si"–OH+NaCl ["Si"—ONa+HCl HCl+KOH [KCl+H$_2$O$_2$.

Procedure 10.00 g of a silica in powder, bead or granule form with a moisture content of 5±1% are size-reduced for 60 seconds using an IKA universal mill M20 (550 W; 20 000 rpm). It may be necessary to adjust the moisture content of the starting substance by drying in a drying oven at 105° C. or by uniform moistening, and to repeat the size reduction process. 2.50 g of the silica thus treated are weighed out at room temperature into a 250 ml titration vessel and 60.0 ml of methanol p.A. are added. When the sample has been wetted completely, 40.0 ml of deionized water are added and the mixture is dispersed using an Ultra Turrax T25 stirrer (stirrer shaft KV-18G, 18 mm diameter) for 30 seconds at a rotary speed of 18 000 rpm. The particles of sample adhering to the edge of the vessel and the stirrer are rinsed into the suspension using 100 ml of deionized water and the suspension is conditioned at 25° C. in a thermostated water bath.

The pH meter (from Knick, model: 766 pH-meter calimatic with temperature sensor) and the pH electrode (combined electrode from Schott, type N7680) are calibrated at room temperature using buffer solutions (pH 7.00 and 9.00). The pH-meter is used first to measure the initial pH of the suspension at 25° C., and then depending on the result the pH is adjusted to 6.00 using potassium hydroxide solution (0.1 mol/l) or hydrochloric acid solution (0.1 mol/l). The consumption of KOH or HCl solution in ml to reach pH 6.00 corresponds to $V_1$'.

Thereafter 20.0 ml of sodium chloride solution (250.00 g of NaCl p.A. made up to 1 l with deionized water) are metered in. Using 0.1 mol/l of KOH the titration is then continued to a pH of 9.00. The consumption of KOH solution in ml to reach pH 9.00 corresponds to $V_2$'.

Subsequently the volumes $V_1$' and $V_2$' are first standardized to the theoretical initial mass of 1 g and expanded by a factor of 5, giving $V_1$ and the Sears number $V_2$ in the units ml/ (5g)

Determination of the BET Surface Area

The specific nitrogen surface area (referred to below as BET surface area) of the powder, bead or granule silica is determined in accordance with ISO 6791-1/Annex D using an AREA-meter (from Ströhlein, JUWE).

Determination of the CTAB Surface Area

The method is based on the adsorption of CTAB (N-hexadecyl-N,N,N-trimethylammonium bromide) on the "external" surface of the silica, which is also referred to as the "rubber-active surface", in accordance with ASTM 3765 or NFT45-007 (section 5.12.1.3). The adsorption of CTAB takes place in aqueous solution with stirring and ultrasound treatment. Excess, unadsorbed CTAB is determined by back-titration with SDSS (dioctylsodium sulfosuccinate solution, "Aerosol TO" solution) using a titroprocessor, the endpoint being indicated by the maximum clouding of the solution and determined using a phototrode. The temperature throughout all of the operations conducted is 23-25° C., to prevent crystallization of CTAB. The back-titration is based on the following reaction equation:

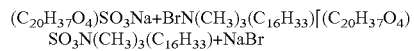

$(C_{20}H_{37}O_4)SO_3Na + BrN(CH_3)_3(C_{16}H_{33})[(C_{20}H_{37}O_4)SO_3N(CH_3)_3(C_{16}H_{33})] + NaBr$

NDSS CTAB

Apparatus

Titroprocessor METTLER Toledo type DL 55 and titroproccessor METTLER Toledo type DL 70, each equipped with: pH electrode, Mettler, type DG 111 and phototrode, Mettler, type DP 500 100 ml polypropylene titration beaker glass titration vessel, 150 ml, with lid pressure filtration device, capacity 100 ml cellulose nitrate membrane filter, pore size 0.1 μm, 47 mm Ø, e.g., Whatman (Order No. 7181-004)

Reagents

The solutions of CTAB (0.015 mol/l in deionized water) and SDSS (0.00423 mol/l in deionized water) are purchased ready-to-use (Kraft, Duisburg: Order No. 6056.4700 CTAB solution 0.015 mol/l; Order No. 6057.4700 SDSS solution 0.00423 mol/l), stored at 25° C. and used within one month.

Procedure

Blank Titration

The consumption of SDSS solution for titrating 5 ml of CTAB solution should be checked 1× daily prior to each series of measurements. This is done by setting the phototrode, before beginning the titration, at 1000±20 mV (corresponding to a transparency of 100%). Precisely 5.00 ml of CTAB solution are pipetted into a titration beaker and 50.0 ml of deionized water are added. Titration with SDSS solution is carried out with stirring by the measurement method familiar to the skilled worker, using the DL 55 titroprocessor, until the solution reaches maximum turbidity. The consumption $V_1$ of SDSS solution, in ml, is determined. Each titration should be performed in triplicate.

Adsorption 10.0 g of the powder, bead or granule silica with a moisture content of 5±2% (if appropriate, the moisture content is adjusted by drying at 105° C. in a drying oven or by uniform wetting) are size-reduced for 30 seconds using a mill (Krups, Model KM 75, Article No. 2030-70). Precisely 500.0 mg of the size-reduced sample are transferred to a 150 ml titration vessel with magnetic stirrer rod and precisely 100.0 ml of CTAB solution are metered in. The titration vessel is closed with a lid and stirred for 15 minutes using a magnetic stirrer. Hydrophobic silicas are stirred with an Ultra Turrax T 25 stirrer (stirrer shaft KV-18G, 18 mm diameter) at 18 000 rpm for a maximum of 1 minute until wetting is complete. The titration vessel is screwed onto the DL 70 titroprocessor and the pH of the suspension is adjusted with KOH (0.1 mol/l) to a figure of 9±0.05. The suspension is sonicated for 4 minutes in the titration vessel in an ultrasound bath (Bandelin, Sonorex RK 106 S, 35 kHz) at 25° C. This is followed immediately by pressure filtration through a membrane filter under a nitrogen pressure of 1.2 bar. The initial fraction of 5 ml is discarded.

Titration 5.00 ml of the remaining filtrate are pipetted into a 100 ml titration beaker and made up to 50.00 ml with deionized water. The titration beaker is screwed onto the DL 55 titroprocessor and titrated with SDSS solution, with stirring, until maximum turbidity is reached. The consumption $V_{II}$ of SDSS solution, in ml, is determined. Each turbidity should be performed as a triplicate determination.

Calculation

With the aid of the measurements $V_I$=consumption of SDSS solution in ml for titrating the blank sample $V_{II}$=consumption of SDSS solution in ml when using the filtrate the following is obtained:

$V_I/V_{II}$=molar amount of CTAB in the blank sample/remaining molar amount of CTAB in the filtrate sample.

It follows from this that the molar amount of N adsorbed on CTAB, in g, is:

$N=((V_I-V_{II})*5.5\ g*5\ ml)/(V_I*1000\ ml)$.

Since only 5 ml of the 100 ml of filtrate were titrated, 0.5 g of silica of defined moisture content was used, and the occupancy of 1 g of CTAB is $578435*10^{-3}\ m^2$, it follows from this that:

CTAB surface area (without water correction) in $m^2/g$= $(N*20*578.435\ m^2/g)/(0.5\ g)$ and CTAB surface area (without water correction) in $m^2/g$=$((V_I-V_{II})*636.2785\ m^2/g)/V_I$.

The CTAB surface area is based on the anhydrous silica, and so the following correction is made.

CTAB surface area in $m^2/g$=(CTAB surface are (without water correction) in $m^2/g*100\%)/100\%$—moisture content in %).

Determination of the DBP Absorption

The DBP absorption (DBP number), which is a measure of the absorbency of the precipitated silica, is determined by a method based on standard DIN 53601, as follows:

Procedure 12.50 g of silica in powder or bead form with a moisture content of 0-10% (the moisture content is adjusted where appropriate by drying in a drying oven at 105° C.) are introduced into the kneader chamber (Article No. 279061) of the Brabender Absorptometer "E". In the case of granules the sieve fraction from 3.15 to 1 mm (stainless steel sieves from Retsch) is used (by gently pressing the granules through the sieve with a pore size of 3.15 mm, using a plastic spatula). With continuous mixing (kneader paddles rotating at a speed of 125 rpm) dibutyl phthalate is added dropwise to the mixture at a rate of 4 ml/min using the Brabender T 90/50 Dosimate. Its incorporation by mixing takes place with only a small amount of force, and is monitored by means of the digital display. Toward the end of the determination the mixture becomes pasty, which is indicated by a sharp increase in the required force. When the display shows 600 digits (taut of 0.6 Nm) an electrical contact shuts off both the kneader and the DBP feed. The synchronous motor for the DBP feed is coupled to a digital counter, so that the consumption of DBP can be read off in ml.

Evaluation

The DBP absorption is reported in g/(100 g) and is calculated from the measured DBP consumption using the following formula. The density of DBP at 20° C. is typically 1.047 g/ml.

DBP absorption in g/(100 g)=((consumption of DBP in ml)*(density of DBP in g/ml)*100)/(12.5 g).

The DBP absorption is defined for the anhydrous, dried silica. When moist precipitated silicas are used it is necessary to correct the value using the correction table below. The correction value, corresponding to the water content, is added to the experimentally determined DBP value; for example, a water content of 5.8% would mean an addition of 33 g/(100 g) for the DPB absorption.

Correction Table for Dibutyl Phthalate Absorption-Anhydrous

|  | .% water | | | | |
| --- | --- | --- | --- | --- | --- |
| % water | .0 | .2 | .4 | .6 | .8 |
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determination of the WK Coefficient Aggregate Size Distribution by Laser Diffraction Sample Preparation Where the silica for measurement comprises granules, 5 g of the granular silica are introduced into a glass beaker and the coarse granules are crushed with a pestle, but not mortared. 1.00 g of the crushed, powder or bead silica with a moisture content of 5±1% (the moisture content is adjusted if appropriate by drying in a drying oven at 105° C. or by uniform moistening), prepared not more than 10 days before, is weighed out into a 30 ml glass centrifuge tube with a domed base (height 7 cm, Ø 3 cm, depth of the convex dome 1 cm) and 20.0 ml of dispersion solution are added (for hydrophilic silicas: 20.0 g of sodium hexametaphosphate (Baker) made up to 1000 ml with deionized water; for hydrophobic silicas: 200.0 ml of ethanol p.A. with 2.0 ml of 25% strength ammonia solution and 0.50 g of Triton X-100 (Merck), made up to 1000 ml with deionized water). Subsequently the centrifuge tube is placed inside a double-walled glass cooling vessel (80 ml capacity, height 9 cm, Ø 3.4 cm) with cooling water circuits for mains water (20° C.) and the sample is treated for 270 s with an ultrasound finger (Bandelin, Type UW 2200 with DH 13 G horn and Ø 13 mm diamond plate). On the power section of the ultrasound finger (Sonopuls, Bandelin, Type HD 2200) 50% power and 80% pulse (corresponding to 0.8 s of power and 0.2 s of pause) are set. The water cooling ensures that the suspension does not heat up by more than 8° C. Until the sample is introduced into the liquid module of the laser diffraction instrument, within 15 minutes, the suspension is stirred with a magnetic stirrer to prevent any sedimentation.

Procedure

Before the beginning of the measurement, the laser diffraction instrument, LS 230 (from Coulter), and the liquid molecule (LS Variable Speed Fluid Module Plus with integrated ultrasound finger CV 181, Coulter) are warmed up for 2 h and the module is rinsed for 10 minutes (menu bar "Control/Rinse"). In the control bar of the instrument's software, the menu item "Measurements" is used to select the file window "Calculate opt. model" and the diffractive indices are stored in a .rfd file as follows: Liquid refractive index R.I. real=1.332; Material refractive index real=1.45; imaginary=0.1. In the "measuring cycle" file window the output of the pump speed is set to 26% and the ultrasound output of the integrated ultrasound finger, CV 181, to 3. The items of ultrasound "during sample addition", "before each measurement for 10 seconds" and "during measurement" are to be activated. Additionally, the following items are selected in this file window: offset measurement, adjustment, background measurement, set measurement concentration, enter sample info, enter measuring info, start 2 measurements, automatic rinse, with PIDS data.

When calibration measurement is complete, with an LS Size Control G15 Standard (Coulter) and the background measurement, the sample is added. Suspended silica is added until a light absorption of 45-55% has been reached and the instrument reports "OK".

The measurement is made at room temperature using the evaluation model of the above-stored .rfd file. For each silica sample, three duplicate determinations, each of 60 seconds with a waiting time of 0 seconds, are carried out.

The software uses the raw data plot to calculate the particle size distribution on the basis of the volume distribution, taking into account the Mie Theory and the optical model of Fraunhofer. Typically a bimodal distribution curve is found, with a mode A between 0-1 μm (maximum at about 0.2 μm) and a mode B between 1-100 μm (maximum at about 5 μm). In accordance with FIG. 1 it is possible to determine the WK coefficient from this, which is reported as the mean value from six individual measurements.

pH Determination

The method, which runs along the lines of DIN EN ISO 787-9, serves for determining the pH of an aqueous suspension of silicas at 20° C. For this purpose an aqueous suspension is prepared of the sample under analysis. After the suspension has been briefly shaken its pH is determined by means of a pH meter which has been calibrated beforehand.

Procedure

Prior to the pH measurement the pH meter (from Knick, Type: 766 pH-Meter Calimatic with temperature sensor) and the pH electrode (Schott N7680 combination electrode) must be calibrated daily, using the buffer solutions, at 20° C. The calibration function should be chosen such that the two buffer solutions used include the expected pH of the sample (buffer solutions of pH 4.00 and 7.00, pH 7.00 and pH 9.00 and, where appropriate pH 7.00 and 12.00). When using granules, 20.0 g of silica are first sized-reduced for 20 s by means of a mill (Krups, Model KM 75, Article No. 2030-70).

5.00 g of powder or bead silica with a moisture content of 5±1% (the moisture content is adjusted where appropriate by drying in a drying oven at 105° C. or uniform moistening prior to possible size-reduction) are weighed to an accuracy of 0.01 g on a precision balance into a wide-necked glass bottle which has been tared beforehand. 95.0 ml of deionized water are added to the sample. Subsequently the suspension is shaken at room temperature in the closed vessel for a period of 5 minutes by means of a shaker machine (Gerhard, Model LS10, 55 W, setting 7). The pH is measured directly after shaking. For that purpose the electrode is first rinsed with deionized water and then with a portion of the suspension, after which it is immersed into the suspension. A magnetic fish is added to the suspension, which is then stirred at a constant stirring speed, with slight vortexing of the suspension, during which the pH measurement is carried out. When the pH meter indicates a constant value, the pH value is read off on the display.

When hydrophobic silica is used, the procedure is the same but in that case 5.00 g of the sample, following size reduction where appropriate, with a moisture content of 5±1% are weighed to an accuracy of 0.01 g on the precision balance into a wide-necked glass bottle which has been tared beforehand. 50.0 ml of methanol p.A. and 50.0 ml of deionized water are added and the suspension is subsequently shaken in the closed vessel for a period of 5 minutes using a shaker machine (Gerhardt, Model LS10, 55 W, setting 7) at room temperature. The pH is again measured with stirring, but after exactly 5 minutes.

Determination of Filtercake Solids Content

This method determines the solids content of filtercakes by removing the volatile fractions at 105° C.

Procedure 100.00 g of the filtercake are weighed out (initial mass E) into a dry, tared porcelain dish (diameter 20 cm). The filtercake is broken up with a spatula if necessary, to give relatively loose lumps of not more than 1 cm$^3$. The sample is dried to constant weight in a drying oven at 105±2° C. Subsequently the sample is cooled to room temperature in a desiccator cabinet with silica gel desiccant. The final mass A is determined gravimetrically.

The solids content in % is determined according to 100%-(((E in g-A in g)*100%)/(E in g)).

Determination of the Electrical Conductivity

The electrical conductivity (CV) of silicas is determined in aqueous suspension.

Procedure

When using granules, first of all 20.0 g of silica are size-reduced for 20 s using a mill (Krups, Model KM 75, Article No. 2030-70). 4.00 g of powder or bead silica with a moisture content of 5±1% (the moisture content is adjusted where appropriate by drying in a drying oven at 105° C. or by uniform moistening, prior to size reduction where appropriate) are suspended in 50.0 ml of deionized water and the suspension heated at 100° C. for 1 minute. After cooling to 20° C. the sample is made up to precisely 100 ml and homogenized by shaking. The measuring cell of the conductivity meter LF 530 (from WTW) is rinsed with a small quantity of sample, before the LTA01 measuring cell is immersed into the suspension. The figure indicated on the display corresponds to the conductivity at 20° C., since the external temperature sensor TFK 530 performs an automatic temperature compensation. This temperature coefficient, and the cell constant k, should be checked prior to each series of measurements.

The calibrating solution used is 0.01 mol/l potassium chloride solution (CV at 20° C.=1278 µS/cm).

The examples below are intended to illustrate the invention without restricting its scope.

EXAMPLE 1

A stainless steel reactor with propeller stirring system and double jacket heating is charged with 43.81 of water and 0.01 kg of waterglass (density 1.348 kg/l, 27.1% SiO$_2$, 8.00% Na$_2$O). Subsequently 7.20 l/h of waterglass and approximately 1.79 l/h of sulfuric acid (density 1.40 kg/l, 50.6% H$_2$SO$_4$) are metered in at 75° C. for 50 minutes with vigorous stirring. This sulfuric acid feed is regulated so that the pH prevailing in the reaction medium (measured at room temperature) is 7.5. Subsequently the addition of waterglass is stopped and the sulfuric acid is continued until a pH of 3.3 (measured at room temperature) has been reached.

The resulting suspension is filtered in the usual manner and washed with water. The filtercake, with a solids content of 18%, is liquefied using aqueous sulfuric acid and a shearing apparatus. The silica feed, with a solids content of 16%, is subsequently spray-dried.

The resulting powder product has a BET surface area of 211 m$^2$/g, a CTAB surface area of 198 m$^2$/g, a DBP absorption of 295 g/(100 g), a Sears number V$_2$ of 16.0 ml/(5 g) and a conductivity of 1600 µS/cm.

EXAMPLE 2

The precipitated silica of the invention from Example 1 is investigated in an emulsion-SBR rubber blend. As state of the art, the readily dispersible tread-grade silica Ultrasil 7000 GR and the high surface area silica Zeosil 1205 MP were selected. Ultrasil 7000 GR is a readily dispersible precipitated silica from Degussa AG having a CTAB surface area of 160±10 m$^2$/g. Zeosil 1205 MP is a high surface area silica from Rhodia having a CTAB surface area of 200±10 m$^2$/g.

The formula used for the rubber blends is that indicated in Table 1 below. In the table, the unit "phr" denotes parts by weight per 100 parts of the crude rubber used. The mixture A contains the silica of the invention, and mixtures R1 and R2 serve as references in accordance with the state of the art. In order to assess the quality of dispersion it is necessary to keep the shear forces introduced during mixing as constant as possible. This can be achieved by metering the silane in accordance with the CTAB surface area; however, in order to keep the crosslinking density comparable as the amount of silane is changed, a sulfur correction according to the sulfur content of the silane is necessary (H.-D. Luginsland, J. Fröhlich, A. Wehmeier, paper No. 59 presented at the ACS Meeting, Apr. 24-27, 2001, Providence/R.I., USA).

The general procedure for producing rubber blends and their vulcanizates is described in "Rubber Technology Handbook", W. Hofmann, Hanser Verlag 1994.

TABLE 1

|  | R1 | R2 | A |
| --- | --- | --- | --- |
| Stage 1 |  |  |  |
| Buna 1500 | 100 | 100 | 100 |
| Ultrasil 7000 GR | 60 | — | — |
| Zeosil 1205 MP | — | 60 | — |
| Silica from Ex. 1 | — | — | 60 |
| Si 69 | 4.80 | 5.77 | 5.83 |
| Renopal NS | 15 | 15 | 15 |
| Stearic acid | 1 | 1 | 1 |
| ZnO | 3 | 3 | 3 |
| Vulkanox HS/LG | 1 | 1 | 1 |

TABLE 1-continued

|  | R1 | R2 | A |
|---|---|---|---|
| Stage 2 | | | |
| Batch stage 1 | | | |
| Stage 3 | | | |
| Batch stage 2 | | | |
| Vulkacit CZ/EG | 1.0 | 1.0 | 1.0 |
| Vulkacit Thiuram/C | 0.75 | 0.75 | 0.75 |
| Sulfur | 0.68 | 0.57 | 0.57 |

The polymer Buna 1500 is an emulsion-polymerized SBR copolymer from Bayer AG having a styrene content of 23.5% by weight. Si 69 is the coupling reagent bis(3-triethoxysilyl-propyl)tetrasulfane from Degussa AG. Renopal NS is a mineral oil from Fuchs Mineralölwerke. Vulkanox HS/LG (TMQ), Vulkazit CZ/EG (CBS), and Vulkacit Thiuram/C (TMTD) are commercial products from Bayer AG.

The rubber blends are produced in an internal mixer in accordance with the mixing method in Table 2. Table 3 summarizes the methods for the testing of the rubber. The blends obtained in this way are vulcanized at 165° C. for 15 minutes. Table 4 shows the results of rubber testing.

TABLE 2

| Stage 1 | |
|---|---|
| Settings | |
| Mixer | Werner & Pfleiderer E type |
| Rotary speed | 70 min$^{-1}$ |
| Die pressure | 5.5 bar |
| Empty volume | 1.58 l |
| Fill level | 0.56 |
| Through-flow temp. | 70° C. |
| Mixing operation | |
| 0 to 1 min | Buna 1500 |
| 1 to 3 min | ½ filler, Si 69, |
| 3 to 4 min | ½ filler, remaining constituents from stage 1 (Renopal NS, stearic acid, ZnO, Vulkanox HS/LG) |
| 4 min | Cleaning |
| 4 to 5 min | Mixing |
| 5 min | Discharge |
| Storage | At room temperature for 24 h |
| Stage 2 | |
| Settings | |
| Mixer | as in stage 1 except for: |
| Rotary speed | 80 min$^{-1}$ |
| Through-flow temp. | 70° C. |
| Fill level | 0.53 |
| Mixing operation | |
| 0 to 2 min | Break up batch from stage 1 |
| 2 to 4 min | Hold batch temperature of 140-150° C. by varying rotary speed |
| 5 min | Discharge |
| Storage | At room temperature for 4 h |
| Stage 3 | |
| Settings | |
| Mixer | as in stage 1 except for: |
| Rotary speed | 40 min$^{-1}$ |
| Fill level | 0.51 |
| Through-flow temp. | 40° C. |
| Mixing operation | |
| 0 to 2 min | Batch from stage 2, Vulkacit CZ/EG, Vulkacit Thiuram/C, sulfur |
| 2 min | Discharge and form sheet on laboratory mixing roll unit |
| Homogenize: | cut in 3* left, 3* right, and fold over, and also tumble 3* with narrow roll nip (1 mm) and 3* with wide roll nip (3.5 mm), and withdraw sheet |

TABLE 3

| Physical testing | Standard/additions |
|---|---|
| ML 1 + 4, 100° C., stage 3 (−) | DIN 53523/3, ISO 667 |
| Vulkameter testing, 165° C. | DIN 53529/3, ISO 6502 |
| Difference in the torque | |
| Dmax − Dmin (dNm) | |
| t10% and t90% (min) | |
| Tensile test on the ring, 23° C. | DIN 53504, ISO 37 |
| Tensile strength (MPa) | |
| Strain values (MPa) | |
| Elongation at break (%) | |
| Shore A hardness, 23° C. (−) | DIN 53 505 |
| Ball rebound (%) | DIN EN ISO 8307, Steel ball 19 mm, 28 g |
| Dispersion coefficient (%) | see text |
| Viscoelastic properties, | DIN 53 613, ISO 2856 |

0 and 60° C., 16 Hz, 50 N preliminary force and 25 N amplitude force
Measured value taken after 2 min test time, i.e., 2 min conditioning
Complex modulus E* (MPa)
Loss factor tan δ (−)

The dispersion coefficient is determined by a light-optical method. The measurement can be carried out by the Deutsche Institut für Kautschuktechnologie e.V. [DIK], Hannover, Germany. In addition, the method is described in H. Geisler, "Bestimmung der Mischgüte", presented at the DIK Workshop, Nov. 27-28, 1997, Hannover, Germany.

TABLE 4

|  | R1 | R2 | A |
|---|---|---|---|
| Data for crude mixture | | | |
| ML 1 + 4 | 62 | 84 | 79 |
| Dmax − Dmin | 5.8 | 5.0 | 5.4 |
| t10% | 4.3 | 3.5 | 3.5 |
| t90% | 4.8 | 8.1 | 7.8 |
| Data for vulcanizate | | | |
| Tensile strength | 23.5 | 23.4 | 24.2 |
| Strain value 100% | 1.5 | 2.0 | 1.6 |
| Strain value 300% | 7.0 | 6.6 | 6.6 |
| Elongation at break | 640 | 670 | 660 |
| Shore A hardness | 57 | 65 | 61 |
| Dispersion coefficient | 96 | 78 | 91 |

As is evident from the data in Table 4, the mixture A with the silica of the invention has a higher Mooney viscosity than the reference mixture R1. This can be attributed to the stronger silica network, as a result of the higher surface area of the silicas of the invention as compared with the reference silica Ultrasil 7000 GR. As compared with the conventional high surface area silica Zeosil 1205 MP in reference mixture R2, however, the viscosity is advantageously lowered, which implies improved processing properties. The vulcanization time t90% is extended as compared with Ultrasil 7000 GR, owing to the absence of accelerator adaptation, and can be attributed to the increased surface area of the silicas of the invention; similarly, the crosslinking density, measured as the difference in torque Dmax-Dmin, has been lowered. Despite the absence of accelerator adaptation, the tensile strengths, strain values, and hardnesses of the inventive mixture A indicate good reinforcement. The hardness of the mixture A is increased only by four points with respect to R3. The hardness of the mixture R2 is significantly more markedly increased, with eight points. This already indicates inadequate dispersion of the conventional high surface area silica in R2. The quality of dispersion of the mixture A is very good, at more than 91%, while the dispersion in R2 with the high surface area, prior art silica is much poorer.

EXAMPLE 3

The precipitated silica of the invention from Example 1 is investigated in an S-SBR/BR rubber blend. Once again, the silicas Ultrasil 7000 GR and Zeosil 1205 MP were selected as state of the art.

The formulae used for the rubber mixtures is indicated in Table 5 below. The reference silica Ultrasil 7000 GR in mixture R3 was modified with 6.4 phr of Si 69. In order to take account of the higher surface area of the reference silica Zeosil 1205 MP and of the silica of the invention, the amount of silane was raised to 8 phr and the amount of sulfur reduced correspondingly in the mixtures R4 and B. Sulfur correction is necessary corresponding to the sulfur content of the silane (H.-D. Luginsland, J. Fröhlich, A. Wehmeier, paper No. 59 presented at the ACS Meeting, Apr. 24-27, 2001, Providence/R.I., USA).

TABLE 5

|  | R3 | R4 | B |
|---|---|---|---|
| Stage 1 |  |  |  |
| Buna VSL 50251 | 96 | 96 | 96 |
| Buna CB 24 | 30 | 30 | 30 |
| Ultrasil 7000 GR | 80 | — | — |
| Zeosil 1205 MP | — | 80 | — |
| Silica from Ex. 1 | — | — | 80 |
| Si 69 | 6.4 | 8.0 | 8.0 |
| ZnO | 2 | 2 | 2 |
| Stearic acid | 2 | 2 | 2 |
| Naftolen ZD | 10 | 10 | 10 |
| Vulkanox 4020 | 1.5 | 1.5 | 1.5 |
| Protektor G35P | 1 | 1 | 1 |
| Stage 2 |  |  |  |
| Batch stage 1 |  |  |  |
| Stage 3 |  |  |  |
| Batch stage 2 |  |  |  |
| Vulkacit D/C | 2.0 | 2.0 | 2.0 |
| Vulkacit CZ/EG | 1.5 | 1.5 | 1.5 |
| Perkazit TBZTD | 0.2 | 0.2 | 0.2 |
| Sulfur | 1.51 | 1.33 | 1.33 |

The polymer VSL 5025-1 is a solution-polymerized SBR copolymer from Bayer AG having a styrene content of 25% by weight and a butadiene content of 75% by weight. The copolymer contains 37.5 phr of oil and has a Mooney viscosity (ML 1+4/100° C.) of 50±4.

The polymer Buna CB 24 is a cis-1,4-polybutadiene (neodymium type) from Bayer AG having a cis-1,4 content of at least 97% and a Mooney viscosity of 44±5.

As an aromatic oil, Naftolen ZD from Chemetall is used. Vulkanox 4020 is 6PPD from Bayer AG, and Protektor G35P is an ozone protector wax from HB-Fuller GmbH. Vulkacit D/C (DPG) and Vulkazit CZ/EG (CBS) are commercial products from Bayer AG. Perkazit TBZTD is available from Akzo Chemie GmbH.

The rubber blends are produced in an internal mixer in accordance with the mixing method in Table 6. Table 3 summarizes the methods of rubber testing. The mixtures are vulcanized at 165° C. for 20 minutes. Table 7 shows the results of rubber testing.

TABLE 6

| Stage 1 | |
|---|---|
| Settings | |
| Mixer | Werner & Pfleiderer E type |
| Rotary speed | 70 min$^{-1}$ |
| Die pressure | 5.5 bar |
| Empty volume | 1.58 l |
| Fill level | 0.56 |
| Through-flow temp. | 80° C. |
| Mixing operation | |
| 0 to 1 min | Buna VSL 5025-1 + Buna CB 24 |
| 1 to 3 min | ½ filler, ZnO, stearic acid, Naftolen ZD, Si 69 |
| 3 to 4 min | ½ filler, Vulkanox 4020, Protektor G35P |
| 4 min | Cleaning |
| 4 to 5 min | Mixing and discharge |
| Storage | At room temperature for 24 h |
| Stage 2 | |
| Settings | |
| Mixer | as in stage 1 except for: |
| Rotary speed | 80 min$^{-1}$ |
| Fill level | 0.53 |
| Mixing operation | |
| 0 to 2 min | Break up batch from stage 1 |
| 2 to 4 min | Hold batch temperature of 140-150° C. by varying rotary speed |
| 5 min | Discharge |
| Storage | At room temperature for 4 h |
| Stage 3 | |
| Settings | |
| Mixer | as in stage 1 except for: |
| Rotary speed | 40 min$^{-1}$ |
| Fill level | 0.51 |
| Through-flow temp. | 50° C. |
| Mixing operation | |
| 0 to 2 min | Batch from stage 2, Vulkacit CZ/EG, Perkazit TBZTD, sulfur |
| 2 min | Discharge and form sheet on laboratory mixing roll unit (diameter 200 mm, length 450 mm, through-flow temperature 50° C.) |
| Homogenize: | cut in 3* left, 3* right, and fold over, and also tumble 8* with narrow roll nip (1 mm) and 3* with wide roll nip (3.5 mm), and withdraw sheet |

TABLE 7

|  | R3 | R4 | B |
|---|---|---|---|
| Data for crude mixture |  |  |  |
| ML 1 + 4 | 60 | 82 | 74 |
| Dmax − Dmin | 16.4 | 19.0 | 17.4 |

TABLE 7-continued

|  | R3 | R4 | B |
|---|---|---|---|
| t10% | 1.5 | 0.7 | 1.2 |
| t90% | 7.4 | 6.7 | 8.2 |
| Data for vulcanizate |  |  |  |
| Tensile strength | 13.3 | 15.4 | 10.6 |
| Strain value 100% | 1.8 | 3.0 | 2.0 |
| Strain value 300% | 10.4 | 12.1 | 10.2 |
| Elongation at break | 350 | 350 | 310 |
| Shore A hardness | 60 | 71 | 63 |
| Ball rebound 60° C. | 60.9 | 56.2 | 60.2 |
| E* (0° C.) | 18.0 | 26.4 | 22.6 |
| E* (60° C.) | 7.7 | 8.8 | 9.0 |
| tan δ (0° C.) | 0.458 | 0.527 | 0.441 |
| tan δ (60° C.) | 0.122 | 0.145 | 0.123 |
| Dispersion coefficient | 98 | 81 | 96 |

As is evident from the data in Table 7, as a result of the higher surface area of the silica of the invention, the Mooney viscosity of the mixture B is slightly increased as compared to R3, but is still better than the prior art reference mixture R4, which has an increased viscosity and poor processing properties. The 100% strain values of R3 and B are comparable, while R4 possesses a much higher hardness and 100% strain value, indicating a much higher silica network owing to the poorer dispersion. Advantages of the mixture B over the reference R3 are evident in the increased dynamic moduli E* 0° C. and 60° C. These higher stiffnesses are particularly important for high-speed automobile and motorbike tires, since they indicate improved dry handling and higher cornering stability. Despite the silica used in mixture B, with a higher CTAB surface area, the tan δ (60° C.) shows, advantageously, virtually no change relative to the mixture R3, which suggests a comparable rolling resistance, while the prior art mixture R4 evidences a significantly higher tan δ (60° C.) and hence rolling resistance. The good reinforcement in combination with the high CTAB surface area of the silica of the invention enables an improved road abrasion of the mixtures B. This improvement in road abrasion can also be achieved when using the high surface area silicas of the invention in natural rubber blends, such as are employed in truck tread mixtures. Particularly in combination with a high surface area, highly structured carbon black such as N 121, excellent road abrasion in the case of truck tires can be achieved. It is in this area of application in particular that an improvement in the cut & chip and chunking behavior is also of particular interest, and can be realized through the use of the high surface area silicas of the invention.

What is claimed is:

1. A precipitated silica, wherein said silica has the following properties:

| BET surface area | 190-302 m²/g, |
| CTAB surface area | ≧170 m²/g, |
| DBP number | 200-300 g/(100 g), and |
| Sears number V₂ | 10-20 ml/(5 g). |

2. The precipitated silica as claimed in claim 1, wherein the CTAB surface area is not more than 300 m²/g.

3. The precipitated silica as claimed in claim 1, having a WK coefficient of ≦3.4 (ratio of the peak height of the particles which cannot be broken down by ultrasound in the size range 1.0-100 μm, to the peak height of the broken-down particles in the size range <1.0 μm).

4. The precipitated silica as claimed in claim 1, wherein the surfaces of said silica have been modified with organosilanes of the formulae I to III:

$$[SiR^1{}_n(RO)_r(Alk)_m(Ar)_p]_q[B] \quad (I),$$

$$SiR^1{}_n(RO)_{3-n}(Alkyl) \quad (II),$$

or $$SiR^1{}_n(RO)_{3-n}(Alkenyl) \quad (III),$$

wherein

B is —SCN, —SH, —Cl, —NH₂, —OC(O)CHCH₂, —OC(O)C(CH₃)CH₂ (if q=1) or —Sw— (if q=2), B being bonded chemically to Alk, R and R¹ are aliphatic, olefinic, aromatic or arylaromatic radicals having 2-30 carbon atoms, which may optionally be substituted by the following groups: hydroxyl, amino, alkoxide, cyanide, thiocyanide, halogen, sulfonic acid, sulfonic ester, thiol, benzoic acid, benzoic ester, carboxylic acid, carboxylic ester, acrylate, methacrylate, organosilane radicals, and wherein R and R¹ may have an identical or different definition or substitution, n is 0, 1 or 2, Alk is a divalent unbranched or branched hydrocarbon radical having from 1 to 6 carbon atoms, m is 0 or 1, Ar is an aryl radical having from 6 to 12 carbon atoms, which may be substituted by the following groups: hydroxyl, amino, alkoxide, cyanide, thiocyanide, halogen, sulfonic acid, sulfonic ester, thiol, benzoic acid, benzoic ester, carboxylic acid, carboxylic ester, organosilane radicals, p is 0 or 1 with the proviso that p and n are not simultaneously 0, q is 1 or 2, w is a number from 2 to 8, r is 1, 2 or 3, with the proviso that r+n+m+p=4, Alkyl is a monovalent unbranched or branched saturated hydrocarbon radical having from 1 to 20 carbon atoms, and Alkenyl is a monovalent unbranched or branched unsaturated hydrocarbon radical having from 2 to 20 carbon atoms.

5. A process for preparing a precipitated silica having the following properties:

| BET surface area | 190-302 m²/g, |
| CTAB surface area | ≧170 m²/g, |
| DBP number | 200-300 g/(100 g), |
| Sears number V₂ | 10-20 ml/(5 g); | wherein said process comprises:

a) introducing, as an initial charge, an aqueous solution of an alkali metal silicate or alkaline earth metal silicate and/or an organic and/or inorganic base with pH 7.0-8.5, b) adding, simultaneously by metered addition, waterglass and an acidifier into the initial charge, with stirring at 55-95° C. for 10-120 minutes, e) acidifying the mixture with an acidifier to a pH of approximately 3.5, and f) filtering and drying the acidified mixture.

6. The process as claimed in claim 5, further comprising carrying out between steps b) and e) the following steps:

c) stopping the metered addition for 30-90 minutes, during which the temperature is maintained, and d) adding, simultaneously by metered addition, waterglass and an acidifier at the same temperature with stirring for 20-120 minutes.

7. The process as claimed in claim 6, wherein the acidifier and/or the waterglass in steps b) and d), each have the same concentration or rate of addition.

8. The process as claimed in claim 6, wherein the acidifier and/or the waterglass in steps b) and d), each have a different concentration or rate of addition.

9. The process as claimed in claim 8, wherein the acidifier and/or the waterglass have the same concentration in steps b) and d), and their rate of addition in step d) is 125-140% of the rate of addition in step b).

10. The process as claimed in claim 5, wherein drying is carried out using a pneumatic conveying drier, spray drier, rack drier, belt drier, rotary tube drier, flash drier, spin-flash drier or nozzle tower.

11. The process as claimed in claim 5, wherein drying is followed by granulation with a roll compactor.

12. The process as claimed in claim 5, wherein during steps b) and/or d), an organic or inorganic salt is added.

13. The process as claimed in claim 5, wherein the precipitated silica is granulated or ungranulated, and wherein the granulated or ungranulated precipitated silica is modified with organosilanes in mixtures from 0.5 to 50 parts per 100 parts of precipitated silica, and the reaction between precipitated silica and organosilane is carried out during the preparation of the mixture (in situ), or outside by spray application and subsequent thermal conditioning of the mixture, or by mixing the organosilane and the silica suspension with subsequent drying and thermal conditioning.

14. An elastomeric blend, a vulcanized rubber blend or a vulcanizate, each comprising the precipitated silica of claim 1, and one or more polymeric resins.

15. A tire comprising the precipitated silica as claimed in claim 1, and one or more rubbers or elastomers.

16. The tire as claimed in claim 15, wherein said tire is a commercial vehicle tire.

17. The tire as claimed in claim 15, wherein said tire is a motorbike tire.

18. The tire as claimed in claim 15, wherein said tire is a high-speed vehicle tire.

19. A vehicle, comprising the tire of claim 15, and a body frame.

20. An article, comprising the elastomeric blend, the vulcanized rubber blend or the vulcanizate of claim 14, and one or more additives.

21. The precipitated silica as claimed in claim 1, wherein the CTAB surface area is 170-220 $m^2/g$.

22. The precipitated silica as claimed in claim 1, wherein the CTAB surface area is 245-300 $m^2/g$.

23. The precipitated silica as claimed in claim 1, wherein the BET surface area is 257-300 $m^2/g$.

24. The precipitated silica as claimed in claim 1, wherein the BET surface area is 190-230 $m^2/g$.

25. The precipitated silica as claimed in claim 1, wherein the DBP number is 207-276 g/(100 g).

26. The precipitated silica as claimed in claim 1, wherein the Sears number $V_2$ is 10-16 ml/ (5 g).

27. The precipitated silica as claimed in claim 3, wherein the WK coefficient is $\leq 3.0$.

28. The precipitated silica as claimed in claim 3, wherein the WK coefficient is $\leq 2.5$.

* * * * *